United States Patent [19]
Keck

[11] Patent Number: 5,277,500
[45] Date of Patent: Jan. 11, 1994

[54] THRUST BEARING ASSEMBLY

[75] Inventor: Arthur C. Keck, Fort Wayne, Ind.

[73] Assignee: General Electric Company, Fort Wayne, Ind.

[21] Appl. No.: 843,006

[22] Filed: Feb. 28, 1992

[51] Int. Cl.⁵ .......................... F16C 25/02; H02K 5/16
[52] U.S. Cl. ..................................... 384/204; 310/90; 384/223
[58] Field of Search ............... 384/203, 204, 223, 420, 384/424, 412; 310/90

[56] References Cited

U.S. PATENT DOCUMENTS

| | | | |
|---|---|---|---|
| 3,553,511 | 1/1971 | Hemmings et al. | 310/156 |
| 3,573,510 | 4/1971 | Otto | 384/412 |
| 3,624,434 | 11/1971 | Dafler | 310/90 |
| 3,786,289 | 1/1924 | Baclawski et al. | 310/90 |
| 3,789,251 | 1/1974 | King | 310/239 |
| 4,008,928 | 2/1977 | Abel. | |
| 4,245,870 | 1/1981 | Punshon et al. | |
| 4,293,170 | 10/1981 | Brezosky | 384/275 |
| 4,295,268 | 10/1981 | Punshon et al. | 29/596 |
| 4,308,478 | 12/1981 | Mertz | 310/90 |
| 4,309,062 | 1/1982 | Bischoff. | |
| 4,456,845 | 6/1984 | Cunningham | 310/90 |
| 4,533,260 | 8/1985 | Andrieux | 384/206 |
| 4,598,220 | 7/1986 | Stone | 310/90 |
| 4,711,590 | 12/1987 | Lakin | 384/206 |
| 4,800,309 | 1/1989 | Lakin | 310/90 |
| 4,887,916 | 12/1989 | Adam et al. | 384/192 |
| 4,955,791 | 9/1990 | Wrobel | 417/354 |

FOREIGN PATENT DOCUMENTS

| | | |
|---|---|---|
| 2212186 | 9/1973 | Fed. Rep. of Germany . |
| 1200765 | 12/1959 | France . |
| 2452652 | 10/1980 | France . |
| 2054759 | 2/1981 | United Kingdom . |

Primary Examiner—Thomas R. Hannon
Attorney, Agent, or Firm—Ralph E. Krisher, Jr.

[57] ABSTRACT

A fractional horsepower motor has a thrust bearing assembly mounted on the motor shaft to dampen the axial movement of the shaft. The assembly includes a thrust collar formed of resinous material and a thrust plate formed of metal with a wave spring positioned therebetween. Apertures in the thrust plate receive resilient hook projections formed on the thrust collar as a means for coupling the plate to the collar. Torque transmitting projections formed on the thrust collar engage notches formed in the thrust plate. The hook projections and the torque transmitting projections act together to capture and hold the wave spring between the collar and plate.

41 Claims, 3 Drawing Sheets

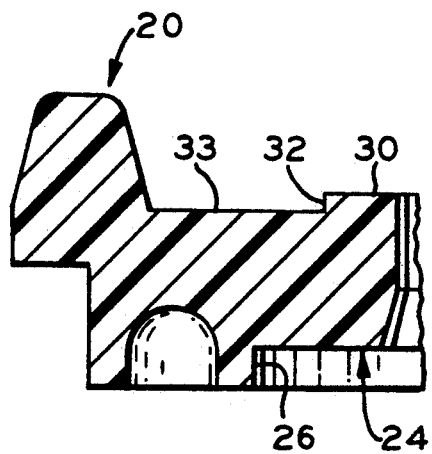
FIG_5
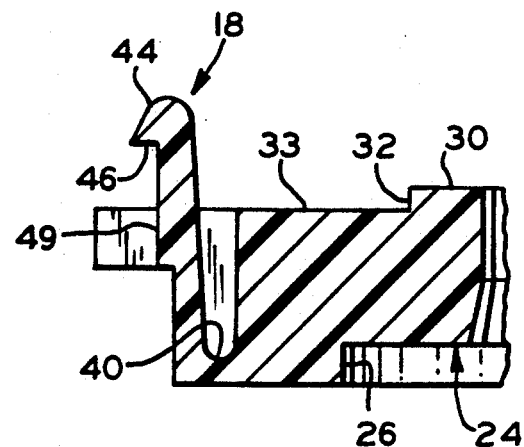
FIG_6
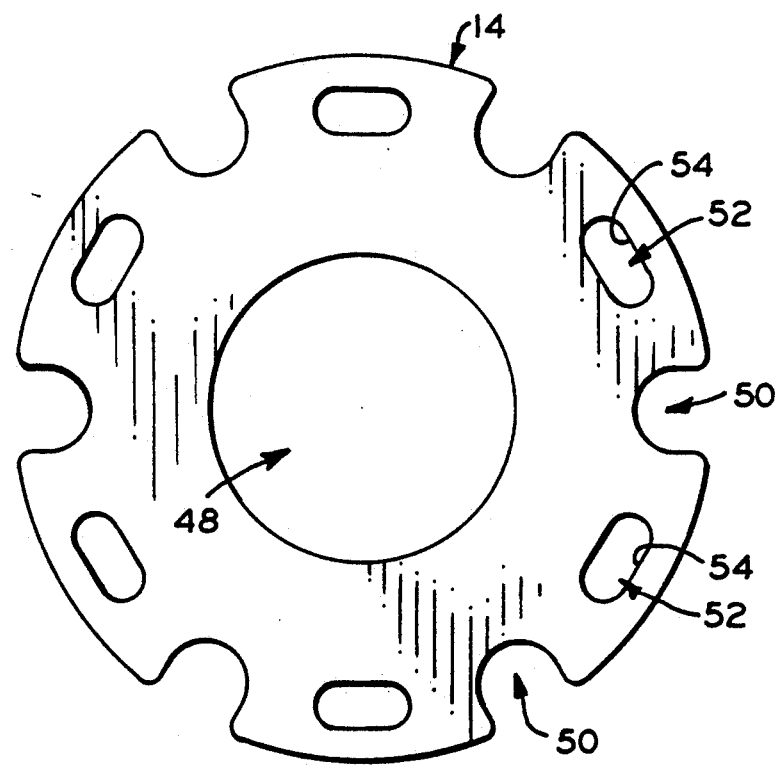
FIG_7

THRUST BEARING ASSEMBLY

BACKGROUND AND SUMMARY OF THE INVENTION

This invention relates generally to bearing assemblies and, more particularly, to thrust bearing assemblies for mounting on a motor shaft.

In fractional horsepower electric motors, the rotor and motor shaft assembly tends to move axially within the housing and against the end plates and bearing means supported in the end plates. Such axial movement of the motor shaft must be limited for proper motor operation since excessive end play is detrimental to machine performance. Additionally, axial vibration gives rise to an objectionable knocking or bumping sound from within the motor. Consequently, thrust bearings are conventionally carried by the motor shaft between the rotor and the bearings mounted in the end plates.

Numerous configurations of such bearings are known. There are, for example, the configurations illustrated and described in U.S. Pat. Nos.: 3,573,510; 3,624,434; 4,955,791; 4,887,916; 3,553,511; 4,008,928; 3,789,251; 4,295,268; 4,245,870; 4,800,309; 4,308,478; and 4,711,590.

In the past, the thrust bearing arrangements for such motors have involved a number of separate components resulting in the need to assemble a number of loose parts at the time of motor assembly. Furthermore there was considerable tolerance build-up of the thrust assembly for free end play control of the motor rotor. Prior designs also tended to use elastomers, such as cushion washers, that deteriorated in the presence of lubricants and reactants that accumulate during motor operation over a wide range of temperature and other operating conditions.

According to the present invention, a thrust bearing assembly for mounting on a motor shaft includes a thrust plate and a thrust collar including first means for joining the thrust plate to the thrust collar, and second means for resiliently damping axial movement of the motor shaft. The second means is positioned between the thrust collar and the thrust plate.

Illustratively, the thrust collar comprises an outer perimeter, and the first means includes perimetrally spaced-apart resilient hook projections and a plurality of perimetrally spaced-apart torque transmitting projections.

In one embodiment of the invention, the thrust plate is formed to include perimetrally spaced-apart apertures to receive the resilient hook projections. The thrust plate further includes a plurality of perimetrally spaced-apart notches into which ends of the torque transmitting projections extend. The hook projections alternate with the torque transmitting projections on the thrust collar.

Further, the second means for damping axial movement comprises a wave spring. Also, the thrust collar is formed of a resinous material and is press fitted to the motor shaft so as to prevent rotational movement between the shaft and thrust bearing assembly, and to restrict lubricant flow along the shaft past the thrust bearing assembly.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

FIG. 5 illustrates a partial section taken through a torque transmitting projection on the thrust collar.

FIG. 6 illustrates a partial section taken through a resilient hook projection on the thrust collar.

FIG. 7 illustrates a plan view of the thrust plate.

DETAILED DESCRIPTION OF THE DRAWINGS

Figure 1:
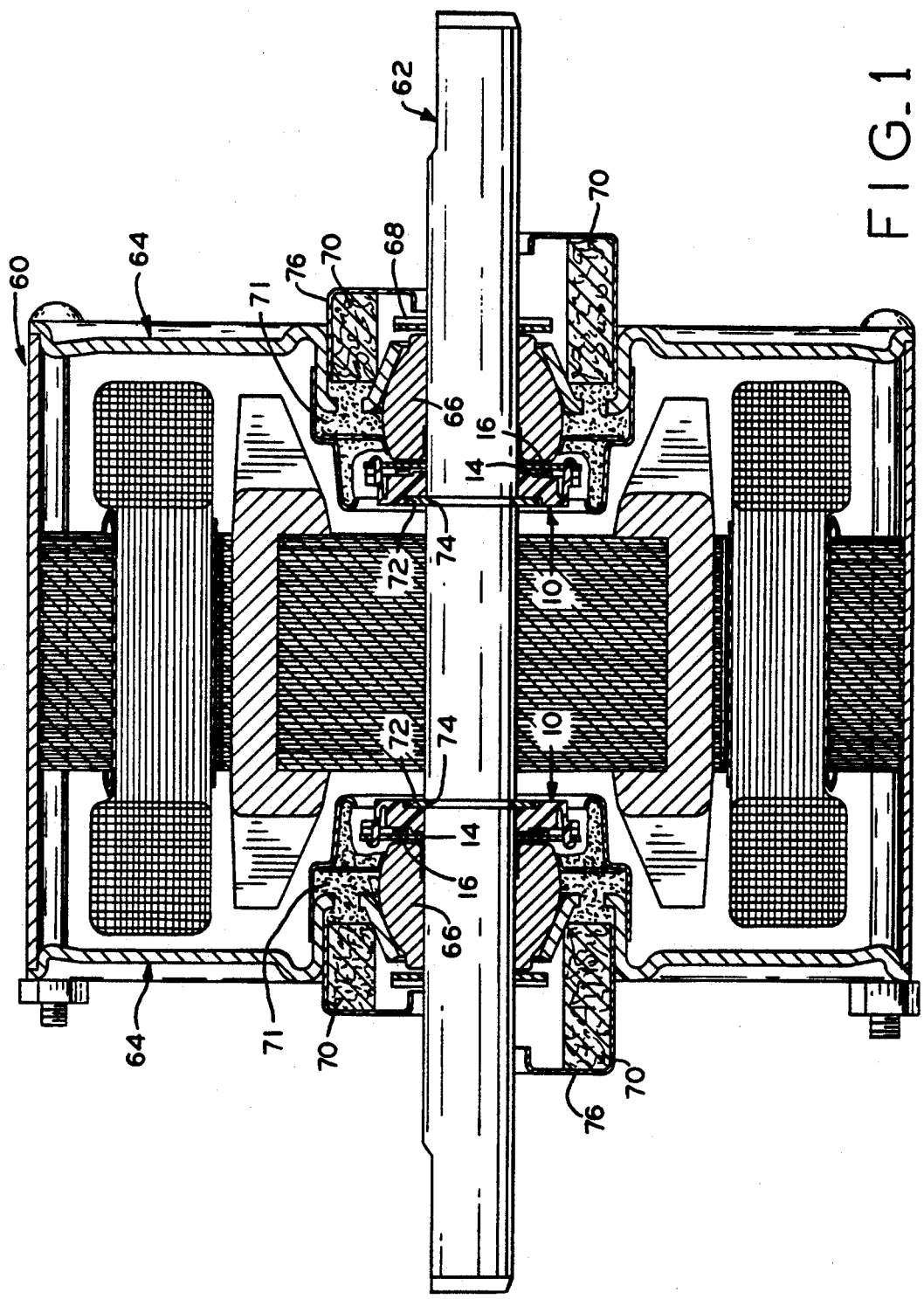
FIG. 1 illustrates a sectional view of a motor transverse to the longitudinal axis of the motor's shaft.
Figure 2:
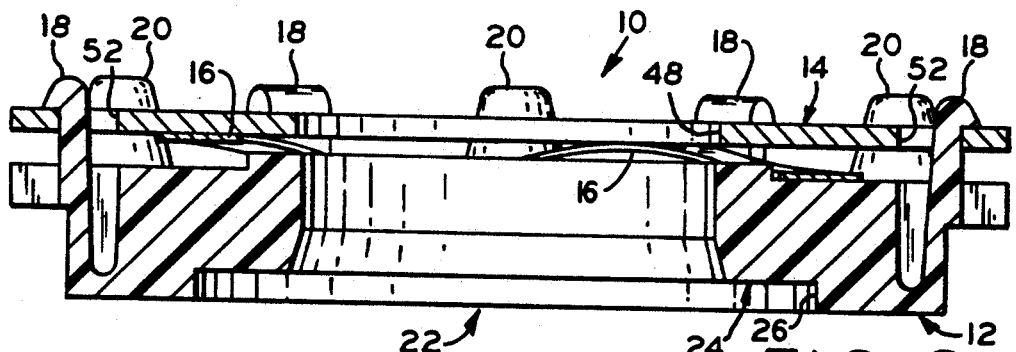
FIG. 2 illustrates a transverse section through the thrust bearing assembly.
Figure 3:
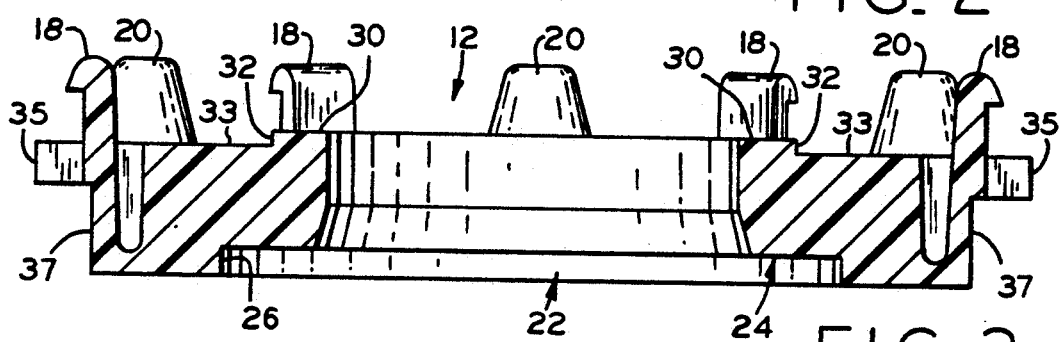
FIG. 3 illustrates the same transverse section as in FIG. 2 of only the thrust collar.

FIG. 1 illustrates a sectional view of, for example, a fractional horsepower motor taken transverse to the longitudinal axis of the motor's shaft 62. The shaft 62 rides in a pair of bearings 66 that are supported by the end plates 64 of the motor housing 60. Snap rings 72 fit in circumferential grooves 74 spaced axially along the shaft 62 at opposite ends of the rotor. The thrust bearing assemblies 10 are positioned between the bearings 66 and the snap rings 72 and are prevented by the snap rings 72 from moving axially inwardly toward the rotor.

During motor operation, there is a tendency for the lubricating oil to move along shaft 62 so as to provide lubrication between shaft 62 and bearings 66. The oil can, and most likely will, move in either direction between shaft 62 and bearings 66 (i.e., oil may move along shaft 62 outwardly away from the rotor or inwardly toward the rotor). The direction of oil movement or flow may change in response to changing operating conditions, and it may not always be practical (or necessary) to determine in which direction the oil moves for a particular set of conditions. When the oil moves outwardly away from the rotor, oil slingers 68 direct oil flow radially from the shaft 62 to spaced, concentric lubricant reservoirs 76. When the oil moves inwardly toward the rotor, thrust bearing assemblies 10 serve as oil slingers to similarly direct oil flow to reservoirs 76.

The stationary reservoirs are filled with porous wick material 70 for directing, by capillary action, the lubricant to shaft bearings 66, thus ensuring continued circulation of the oil and proper lubrication of bearings 66. Wick material 70 serves as "storage" wicks which comprise fibrous, solid pad-like structures which absorb, and are generally soaked in, lubricating oil. Inwardly adjacent these pad-like wicks are second wicking elements 71. Wicking elements 71 are formed of a mixture of short fibers and oil having a consistency which allows for injection into closed spaces, as illustrated in FIG. 1. Elements 71 have a relatively high density, as compared to wick material 70, to facilitate the flow of oil around bearings 66.

Referring now to FIGS. 2-7, each thrust bearing assembly 10 comprises a thrust collar 12, a thrust plate 14 and a wave spring 16. Resilient hook projections 18 of the thrust collar 12 engage the thrust plate 14 by insertion through apertures 52 formed in the thrust plate 14. A wave spring 16 is positioned between the thrust collar 12 and thrust plate 14.

The thrust collar 12 is somewhat circular and disk-shaped, although other geometries may be used. Thrust collar 12 is illustratively formed of resinous material. It has a center opening 22 for accommodating shaft 62. A circular indentation 24 is formed in one axial face of the collar 12 for receiving the snap ring 72 when thrust bearing assembly 10 is fully assembled and mounted on shaft 62. Indentation 24 is formed adjacent center opening 22 and extends radially outwardly therefrom to a radially outer surface 26. Snap ring 72, when fitted into the circumferential groove 74 in the shaft 62, prevents axial movement of the thrust bearing assembly 10 axially inwardly along shaft 62 into the rotor.

A wave spring positioning ridge 30 is formed on the opposite axially facing surface of the collar 12 adjacent to the center opening 22. Ridge 30 extends radially outwardly from the center opening 22 to a radially outer surface 32. The wave spring 16 is designed to ride outside the radially outer surface 32 and thereby maintained centered about the shaft 62. The collar 12 includes a radially outer edge 35.

Figure 4:
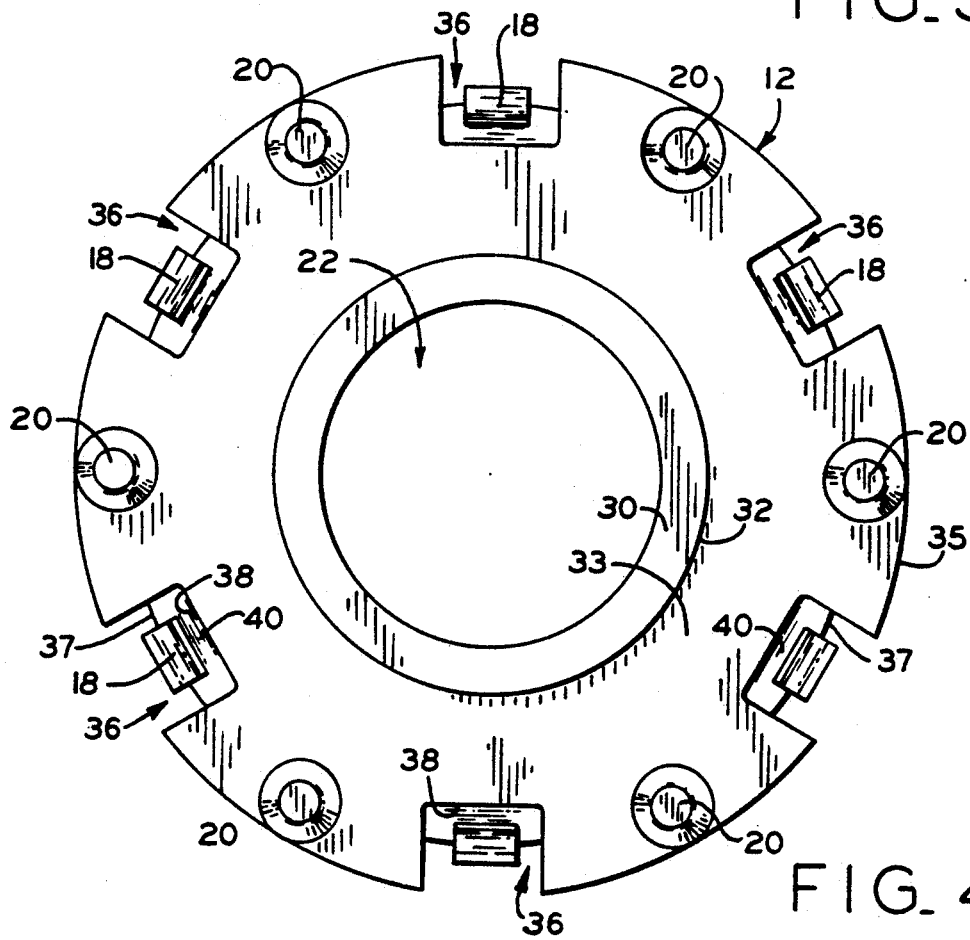
FIG. 4 illustrates a plan view of the thrust collar.

As best seen in FIG. 4, somewhat rectangular notches 36 are provided in the outer edge 35 at uniformly spaced-apart locations. The notches 36 extend radially inwardly from the edge 35 beyond a surface 37 which is spaced radially inwardly from edge 35.

Torque transmitting projections 20 alternate perimetrally with notches 36. As best seen in FIG. 5, the torque transmitting projections 20 are axially extending truncated cones, whose bases where they are joined to collar 12 are wider than their remote ends.

As best seen in FIG. 6, the resilient hook projections 18 extend axially through the notches 36 from a surface 40 beyond the axially facing surface 33 of the collar 12. Each hook projection is provided with a rounded shoulder 44 having an engaging surface 46, which lies generally parallel to the plane of surface 33.

Referring now to FIG. 7, the thrust plate 14 is generally circular, although other geometries may be used. The thrust plate 14 is preferably formed of metal and has a center aperture 48. The diameter of the aperture 48 is slightly larger than the diameter of the center opening 22 of the thrust collar 12, and is also larger than the outer diameter of shaft 62. The thrust plate 14 has a plurality of circumferentially spaced, U-shaped notches 50 for receiving the torque transmitting projections 20. A plurality of circumferentially spaced, oval apertures 52 are provided in the thrust plate. These alternate circumferentially around the thrust plate 14 with the U-shaped notches 50 around the thrust plate 14.

Apertures 52 receive resilient hook projections 18. The radially outer edge 54 of each aperture 52 is positioned at a radial distance from the center of thrust plate 14 slightly less than, but approximately equal to the radial distance of the distal surface 49 of each resilient hook projection 18 from the center of thrust collar 12. In operation, the engaging surface 46 of each shoulder 44 engages the axial surface of the thrust plate 14, and the distal surface 49 of each resilient hook projection 18 contacts the radially outer edge 54 of a respective aperture 52.

During assembly, a wave spring 16 is laid on surface 33 of the collar 12 so as to encircle the wave spring positioning ridge 30. With the wave spring in place, the thrust plate 14 is aligned so that the U-shaped notches 50 line up with the torque transmitting projections 20, and the oval-shaped apertures 52 align with the resilient hook projections 18 formed on the thrust collar 12.

Pushing the thrust plate 14 onto the collar 12 resiliently deflects the resilient hook projections 18 to bend radially inwardly until the engaging surface 46 clears the axial surface of the thrust plate 14, at which time, the hook projections 18 snap into position with the distal surfaces 49 of the resilient hook projections 18 contacting the radially outer edges 54 of respective apertures 52.

The engaging surfaces 46 of the resilient hook projections 18 are spaced sufficiently from surface 33 of the thrust collar 12 to permit the thrust plate 14 to ride between the engaging surfaces 46 and surface 33 of thrust collar 12, and permit wave spring 16 to be compressed during operation. In the assembled and unloaded thrust bearing assembly 10, wave spring 16 is partially compressed which serves to hold thrust bearing assembly 10 in its assembled configuration During assembly of motor 60, thrust bearing assemblies 10 are press fitted to the motor shaft 62 and are located between respective snap rings 72 and shaft bearings 66. Thrust bearing assemblies 10 dampen the axial movements of the shaft 62 by butting up against the bearings 66 and absorbing at least a portion of the impact energy. During axial movement of the motor shaft 62, the thrust plates 14 come into contact with the stationary shaft bearing 66. The larger diameter of the center aperture 48 allows the shaft movement to continue after the thrust plate 14 contacts the bearing 66. Further movement of the shaft 62 compresses the wave spring 16, setting up a force within the spring that is proportional to the amount of compression and which acts against axial surface 33 of the thrust collar 12 to oppose the movement of the shaft 62. The opposing force is transmitted by the collar 12 directly to the snap ring 72 and thus to the shaft 62. Because the opposing force is proportional to the amount of compression, there is a gradual damping of the movement of the shaft 62. Without the wave spring 16 to absorb the impact, the shaft 62 would bump against the shaft bearing 66, giving rise to a knocking noise.

The thrust bearing assemblies of the present invention are useful in a method of making an electric motor which comprises the following steps: mounting a rotor core on a shaft; mounting a pair of thrust bearing assemblies on either side of the rotor core to form a rotor sub-assembly; mounting a first end of the shaft of the rotor sub-assembly into a bearing portion of a first end shield/bearing sub-assembly; positioning a motor frame/stator sub-assembly over the rotor sub-assembly; and mounting a second end of the shaft into a bearing portion of a second end shield/bearing sub-assembly. The end shields and motor frame are then secured together, such as by bolts or screws, to complete the assembly. This method is particularly well-suited to an automated assembly process. The sub-assembly operations involved in producing the various components of the motor (i.e., the thrust bearing assemblies, the end shield/bearing sub-assemblies, etc.) can take place away from the assembly line under controlled conditions.

Although the invention has been described in detail with reference to certain illustrative embodiments, variations and modifications exist within the scope and spirit of the invention as described and defined in the following claims.

I claim:

1. A thrust bearing assembly for mounting on a motor shaft, the assembly comprising:
   a thrust collar;

a thrust plate;

first means for joining the thrust plate to the thrust collar;

second means disposed between the thrust collar and thrust plate for resiliently damping axial movements of the motor shaft; and third means, separate and distinct from said first means, for transmitting torque from said thrust collar to said thrust plate.

2. The assembly of claim 1, wherein the first means comprises a plurality of perimetrally spaced-apart resilient hook projections, and wherein said third means comprises a plurality of perimetrally spaced-apart torque-transmitting projections formed on said thrust collar.

3. The assembly of claim 2, wherein the thrust plate is formed to include perimetrally spaced-apart apertures to receive the resilient hook projections and a plurality of perimetrally spaced-apart notches into which ends of the torque transmitting projections extend.

4. The assembly of claim 3, wherein the hook projections alternate with the torque transmitting projections on the thrust collar.

5. The assembly of claim 1, wherein the second means for damping axial movement comprises a wave spring.

6. The assembly of claim 1, wherein the thrust collar is press fitted to the motor shaft so as to restrict relative rotation of the thrust assembly and the shaft and so as to restrict lubricant flow along the shaft past the assembly.

7. The assembly of claim 1, wherein the thrust collar is formed of a resinous material.

8. An assembly for bearing thrust on a motor shaft, the assembly comprising:

first means for mounting the assembly on the motor shaft;

second means for providing a bearing surface;

third means for resiliently damping axial movements of the motor shaft, the third means positioned between the first means and the second means;

fourth means for connecting the second means to the first means and capturing the third means between the first and second means; and fifth means for transmitting torque from said first means to said second means.

9. The assembly of claim 8, wherein the first means comprises a thrust collar having a perimeter, and the fourth means comprises perimetrally spaced-apart resilient hook projections for engaging the second means.

10. The assembly of claim 9, wherein the fifth means comprises perimetrally spaced-apart torque-transmitting projections formed on the thrust collar. the hook projections alternating with the torque-transmitting projections around the thrust collar.

11. The assembly of claim 10, wherein the second means comprises a thrust plate having perimetrally spaced-apart apertures for receiving the resilient hook projections and perimetrally spaced-apart notches for engaging the torque transmitting projections.

12. The assembly of claim 9, wherein the thrust collar is formed of a resinous material and is press fitted to the motor shaft so as to restrict relative rotation of the thrust assembly and the shaft and so as to restrict the flow of lubricant along the shaft past the assembly.

13. The assembly of claim 8, wherein the third means comprises a wave spring.

14. A motor comprising a rotor having a shaft, a motor housing, bearing means supported in the motor housing for rotatably receiving the shaft, and a thrust bearing sub-assembly mounted on the shaft adjacent the bearing means, the thrust bearing sub-assembly comprising:

a thrust collar having a plurality of perimetrally spaced-apart resilient hook projections and a plurality of perimetrally spaced-apart torque transmitting projections;

a thrust plate attached to the thrust collar, wherein the thrust plate is formed to include a plurality of perimetrally spaced-apart apertures to receive the resilient hook projections and a plurality of perimetrally spaced-apart notches for engaging the torque transmitting projections; and first means positioned between the thrust collar and thrust plate for damping axial movements of the motor shaft.

15. The motor of claim 14, wherein the first means for damping axial movements comprises a wave spring.

16. The motor of claim 14, wherein the thrust collar is press fitted to the motor shaft so as to restrict relative rotation of the thrust assembly and the shaft and so as to restrict lubricant flow along the shaft past the assembly to the rotor.

17. The motor of claim 14, wherein the resilient hook projections alternate with the torque transmitting projections around the perimeter of the thrust collar.

18. The motor of claim 14, further comprising a reservoir disposed adjacent the bearing means for storing a supply of lubricating oil, said thrust bearing subassembly being mounted on the shaft adjacent the reservoir so as to serve as an oil slinger for returning oil from the bearing means to the reservoir.

19. A motor comprising a rotor having a shaft, a motor housing, bearing means supported in the motor housing for rotatably receiving the shaft, and a thrust bearing subassembly mounted on the shaft adjacent the bearing means, the thrust bearing sub-assembly comprising:

a thrust collar;

a thrust plate;

first spring means positioned between the thrust collar and thrust plate for resiliently damping axial movements of the motor shaft;

first means for joining the thrust plate to the thrust collar; and second means for transmitting torque from the thrust collar to the thrust plate.

20. The motor of claim 19, wherein the thrust collar includes a plurality of perimetrally spaced-apart resilient hook projections and a plurality of perimetrally spaced-apart torque transmitting projections.

21. The motor of claim 20, wherein the thrust plate is formed to include a plurality of perimetrally spacedapart apertures to receive the resilient hook projections and a plurality of perimetrally spaced-apart notches into which the ends of the torque transmitting projections extend.

22. The motor of claim 20, wherein the resilient hook projections alternate with the torque transmitting projections perimetrally around the thrust collar.

23. The motor of claim 19, wherein the first spring means for damping axial movements comprises a wave spring.

24. The motor of claim 19, wherein the thrust collar is formed of a resinous material and is press fitted to the motor shaft so as to restrict relative rotation of the thrust bearing assembly and the shaft.

25. The motor of claim 19, further comprising a reservoir disposed adjacent the bearing means for storing a supply of lubricating oil, said thrust bearing subassembly being mounted on the shaft adjacent the reservoir so as to serve as an oil slinger for returning oil from the bearing means to the reservoir.

26. A thrust bearing assembly for mounting on a motor shaft, the assembly comprising:
   a thrust collar including a plurality of perimetrally spaced-apart resilient hook projections and a plurality of perimetrally spaced-apart torque transmitting projections;
   a thrust plate including a plurality of perimetrally spaced-apart apertures to receive the resilient hook projections and a plurality of perimetrally spaced-apart notches into which the ends of the torque transmitting projections extend; and
   spring means positioned between the thrust collar and thrust plate for resiliently damping axial movement of the motor shaft.

27. A rotor assembly for an electric motor, comprising:
   a shaft;
   a rotor core mounted on the shaft; and
   first and second bearing assemblies non-rotatably mounted to the shaft adjacent opposing ends of the rotor core, each of said thrust bearing assemblies comprising a thrust collar, a thrust plate, first means for joining the thrust plate to the thrust collar, and second means disposed between the thrust collar and thrust plate for resiliently damping axial movements of the motor shaft, wherein the thrust collar is press fitted to the motor shaft so as to restrict relative rotation of the thrust assembly and the shaft and so as to restrict lubricant flow along the shaft past the assembly.

28. A rotor assembly according to claim 27, wherein said thrust collar has a plurality of perimetrally spaced, torque-transmitting projection for engaging a corresponding plurality of apertures in said thrust plate.

29. A rotor assembly according to claim 28, wherein said thrust collar further has a plurality of hook-like projections for engaging said thrust plate and securing the thrust plate to the thrust collar.

30. A thrust bearing assembly for mounting on a motor shaft, the assembly comprising:
   a thrust collar;
   a thrust plate;
   first means for joining the thrust plate to the thrust collar; and
   second means disposed between the thrust collar and thrust plate for resiliently damping axial movements of the motor shaft;
   wherein the first means comprises a plurality of perimetrally spaced-apart resilient hook projections and a plurality of perimetrally spaced-apart torque-transmitting projections formed on said thrust collar; and
   wherein the thrust plate is formed to include perimetrally spaced-apart apertures to receive the resilient hook projections and a plurality of perimetrally spaced-apart notches into which ends of the torque-transmitting projections extend.

31. The assembly of claim 30, wherein the hook projections alternate with the torquetransmitting projections on the thrust collar.

32. A thrust bearing assembly for mounting on a motor shaft, the assembly comprising:
   a thrust collar;
   a thrust plate;
   first means for joining the thrust plate to the thrust collar; and
   second means disposed between the thrust collar and thrust plate for resiliently damping axial movements of the motor shaft;
   wherein the thrust collar is press fitted to the motor shaft so as to restrict relative rotation of the thrust assembly and the shaft and so as to restrict lubricant flow along the shaft past the assembly.

33. The assembly of claim 32, wherein the thrust collar is formed of a resinous material.

34. An assembly for bearing thrust on a motor shaft, the assembly comprising:
   first means comprising a thrust collar for mounting the assembly on the motor shaft;
   second means comprising a thrust plate for providing a bearing surface;
   third means for resiliently damping axial movements of the motor shaft, the third means positioned between the first means and the second means; and
   fourth means for connecting the second means to the first means and capturing the third means between the first and second means;
   wherein the thrust collar is formed of a resinous material and is press fitted to the motor shaft so as to restrict relative rotation of the thrust assembly and the shaft and so as to restrict the flow of lubricant along the shaft past the assembly.

35. An assembly according to claim 34, wherein the thrust collar has a perimeter and the fourth means includes perimetrally spaced-apart resilient hook projections for engaging the second means.

36. The assembly of claim 35, wherein the thrust collar further comprises perimetrally spaced-apart torque transmitting projections, the hook projections alternating with the torque transmitting projections around the thrust collar.

37. The assembly of claim 36, wherein the thrust plate has perimetrally spaced-apart apertures for receiving the resilient hook projections and perimetrally spaced-apart notches for engaging the torque transmitting projections.

38. A motor comprising a rotor having a shaft, a motor housing, bearing means supported in the motor housing for rotatably receiving the shaft, and a thrust bearing subassembly mounted on the shaft adjacent the bearing means, the thrust bearing sub-assembly comprising:
   a thrust collar;
   a thrust plate attached to the thrust collar; and
   first spring means positioned between the thrust collar and thrust plate for resiliently damping axial movements of the motor shaft;
   wherein the thrust collar includes a plurality of perimetrally spaced-apart resilient hook projections and a plurality of perimetrally spaced-apart torque-transmitting projections; and
   wherein the thrust plate is formed to include a plurality of perimetrally spaced-apart apertures to receive the resilient hook projections and a plurality of perimetrally spaced-apart notches into which the ends of the torque-transmitting projections extend.

39. The motor of claim 38, wherein the resilient hook projections alternate with the torque-transmitting projections perimetrally around the thrust collar.

40. A motor comprising a rotor having a shaft, a motor housing, bearing means supported din the motor housing for rotatably receiving the shaft, and a thrust bearing sub-assembly mounted on the shaft adjacent the bearing means, the thrust bearing sub-assembly comprising:
- a thrust collar;
- a thrust plate attached to the thrust collar; and
- first spring means positioned between the thrust collar and thrust plate for resiliently damping axial movements of the motor shaft; and
- wherein the thrust collar is formed on a resinous material and is press fitted to the motor shaft so as to restrict relative rotation of the thrust bearing assembly and the shaft.

41. An assembly for bearing thrust on a motor shaft, the assembly comprising:
- first means for mounting the assembly on the motor shaft;
- second means for providing a bearing surface;
- third means for resiliently damping axial movements of the motor shaft, the third means positioned between the first means and the second means; and
- fourth means for connecting the second means to the first means and capturing the third means between the first and second means;
- wherein the first means comprises a thrust collar having a perimeter, the fourth means including perimetrally spaced-apart resilient hook projections for engaging the second means; and
- wherein the first means further comprises perimetrally spaced-apart projections for transmitting torque, the hook projections alternating with the torque-transmitting projections around the thrust collar; and
- wherein the second means comprises a thrust plate having perimetrally spaced-apart apertures for receiving the resilient hook projections and perimetrally spaced-apart notches for engaging the torque-transmitting projections.

* * * * *

UNITED STATES PATENT AND TRADEMARK OFFICE
CERTIFICATE OF CORRECTION

PATENT NO. : 5,277,500                  Page 1 of 2
DATED : January 11, 1994
INVENTOR(S) : Arthur C. Keck It is certified that error appears in the above-indentified patent and that said Letters Patent is hereby corrected as shown below:

Column 5

Claim 6, line 3, after "thrust" insert --bearing--.

Claim 10, line 3, delete the period after "collar" and insert a comma.

Column 6

Claim 21, lines 2 and 3, delete "spaceda-part" and insert therefor --spaced-apart--;
line 5, delete "the" (first occurrence).

Claim 24, line 4, delete "assembly" and insert therefor --sub-assembly--.

Column 7

Claim 26, line 4, after "and" continue the sentence with the text of line 5;
line 10, delete "the" (first occurrence).

Claim 27, line 7, delete "thrust";
line 14, delete "thrust" and insert therefor --bearing--.

Claim 28, line 3, delete "projection" and insert therefor --projections--.

Claim 31, line 2, delete "torquetransmitting" and insert therefor --torque-transmitting--.

UNITED STATES PATENT AND TRADEMARK OFFICE
CERTIFICATE OF CORRECTION

PATENT NO. : 5,277,500
DATED : January 11, 1994
INVENTOR(S) : Arthur C. Keck

It is certified that error appears in the above-indentified patent and that said Letters Patent is hereby corrected as shown below:

Column 8

Claim 32, line 11, after "thrust" insert --bearing--.

Claim 34, line 15, delete "thrust".

Claim 38, line 20, delete "the" (first occurrence).

Column 9

Claim 40, line 2, delete "din" and insert therefor --in--;
line 12, delete "on" and insert therefor --of--;
line 15, delete "assembly" and insert therefor --sub-assembly--.

Signed and Sealed this

Twenty-fifth Day of July, 1995

Attest:

BRUCE LEHMAN

Attesting Officer  Commissioner of Patents and Trademarks